United States Patent
Taunton et al.

(10) Patent No.: US 7,734,041 B2
(45) Date of Patent: *Jun. 8, 2010

(54) SYSTEM AND METHOD FOR DE-SCRAMBLING AND BIT-ORDER-REVERSING PAYLOAD BYTES IN AN ASYNCHRONOUS TRANSFER MODE CELL

(75) Inventors: Mark Taunton, Cambridge (GB); Timothy Martin Dobson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 1530 days.

This patent is subject to a terminal disclaimer.

(21) Appl. No.: 10/946,303

(22) Filed: Sep. 22, 2004

(65) Prior Publication Data

US 2005/0068957 A1 Mar. 31, 2005

Related U.S. Application Data

(60) Provisional application No. 60/505,860, filed on Sep. 26, 2003.

(51) Int. Cl.
*H04L 12/56* (2006.01)
(52) U.S. Cl. ............... 380/28; 380/255; 380/257; 370/310.1; 712/22
(58) Field of Classification Search ........ 380/255, 380/257, 28; 712/22; 370/310.1
See application file for complete search history.

(56) References Cited

U.S. PATENT DOCUMENTS

| | | | |
|---|---|---|---|
| 5,369,773 A | 11/1994 | Hammerstrom | |
| 5,612,974 A | 3/1997 | Astrachan | |
| 5,719,890 A | 2/1998 | Thomman et al. | |
| 5,809,493 A | 9/1998 | Ahamed et al. | |
| 5,909,427 A | 6/1999 | Manning et al. | |
| 5,931,954 A | 8/1999 | Alamouti | |
| 5,954,836 A | 9/1999 | Wang | |
| 6,061,449 A | 5/2000 | Candelore et al. | |
| 6,081,921 A | 6/2000 | Simanapalli | |
| 6,182,265 B1 | 1/2001 | Lim et al. | |
| 6,314,102 B1 | 11/2001 | Czerwiec et al. | |
| 6,442,729 B1 | 8/2002 | Kim et al. | |
| 6,448,910 B1 | 9/2002 | Lu | |
| 6,570,927 B1 | 5/2003 | Van Stralen et al. | |

(Continued)

OTHER PUBLICATIONS

*Splitterless asymmetric digital subscriber line transceivers 2 (splitterless ADSL2)*, International Telecommunications Union (ITU-T Recommendation G.992.4), 24 pages, Jul. 2002.

(Continued)

*Primary Examiner*—Kimyen Vu
*Assistant Examiner*—Edward Zee
(74) *Attorney, Agent, or Firm*—Sterne, Kessler, Goldstein & Fox PLLC

(57) ABSTRACT

A method and apparatus are disclosed for efficiently de-scrambling and bit-order-reversing one or more bytes of data according to DSL standards on a processor. In a preferred embodiment, this is achieved by providing an instruction for de-scrambling and bit-order-reversing one or more bytes of data according to DSL standards. Accordingly, the invention advantageously provides a processor with the ability to de-scramble and bit-order-reverse data with a single instruction thus allowing for more efficient and faster de-scrambling operations for subsequent processing.

22 Claims, 4 Drawing Sheets

U.S. PATENT DOCUMENTS

| | | |
|---|---|---|
| 6,577,678 B2 | 6/2003 | Scheuermann |
| 6,631,488 B1 | 10/2003 | Stambaugh et al. |
| 6,697,994 B2 | 2/2004 | Ishikawa |
| 6,754,283 B1 | 6/2004 | Li |
| 6,915,472 B1 | 7/2005 | Jones, IV et al. |
| 7,039,852 B2 | 5/2006 | Dent |
| 7,055,088 B2 | 5/2006 | Betts |
| 7,139,305 B2 | 11/2006 | Gavnoudias et al. |
| 7,154,895 B1 | 12/2006 | Bornemisza et al. |
| 7,199,740 B1 | 4/2007 | Ferguson et al. |
| 7,305,567 B1 * | 12/2007 | Hussain et al. ............... 713/189 |
| 7,305,608 B2 | 12/2007 | Taunton et al. |
| 2001/0008001 A1 | 7/2001 | Suemura |
| 2002/0124154 A1 | 9/2002 | Stacey et al. |
| 2003/0016670 A1 | 1/2003 | Seidl et al. |
| 2003/0091109 A1 | 5/2003 | Okunev et al. |
| 2003/0190910 A1 | 10/2003 | Scheuermann |
| 2003/0225949 A1 * | 12/2003 | Hoang et al. ................... 710/22 |
| 2004/0025104 A1 | 2/2004 | Amer |
| 2005/0068958 A1 | 3/2005 | Taunton et al. |
| 2005/0068959 A1 | 3/2005 | Taunton et al. |
| 2005/0069134 A1 | 3/2005 | Taunton et al. |
| 2005/0084104 A1 | 4/2005 | Taunton et al. |
| 2005/0094551 A1 | 5/2005 | Taunton et al. |
| 2005/0100111 A1 | 5/2005 | Taunton et al. |
| 2008/0137771 A1 | 6/2008 | Taunton et al. |

OTHER PUBLICATIONS

*Asymmetric digital subscriber line (ADSL) transceivers*, International Telecommunications Union (ITU-T Recommendation G.992.1), 256 pages, Jun. 1999.

*Splitterless asymmetric digital subscriber line (ADSL) transceivers*, International Telecommunication Union (ITU-T Recommendation G.992.2), 179 pages, Jun. 1999.

*Asymmetric digital subscriber line transceivers 2 (ADSL2)*, International Telecommunication Union (ITU-T Recommendation G.992.3), 436 pages, Jan. 2005.

International Telecommunications Union, "Integrated Services Digital Network (ISDN) ISDN User Network Interfaces", ITU-T Recommendation I.432, Mar. 1993, all pages.

* cited by examiner

FIG. 3A

| OPCODE | DESTINATION | SOURCE 1 | SOURCE 2 |

FIG. 3B

| ATMDSC | OUT | STATE | IN |

SYSTEM AND METHOD FOR DE-SCRAMBLING AND BIT-ORDER-REVERSING PAYLOAD BYTES IN AN ASYNCHRONOUS TRANSFER MODE CELL

CROSS-REFERENCE TO RELATED APPLICATIONS

This application claims priority from U.S. provisional application No. 60/505,860 filed on Sep. 26, 2003 by Mark Taunton and Timothy Martin Dobson and entitled "System and Method for De-Scrambling and Bit-Correcting Payload Bytes in an Asynchronous Transfer Mode Cell" which is incorporated by reference herein in its entirety. This application is also related to U.S. patent application Ser. No. 10/946,305; filed on Sep. 22, 2004.

BACKGROUND OF THE INVENTION

1. Field of the Invention

The present invention relates generally to Asynchronous Transfer Mode (ATM) systems and to the design of instructions for processors. More specifically, the present invention relates to a system, method and processor instruction for de-scrambling and bit-order-reversing ATM payload data.

2. Related Art

ATM (Asynchronous Transfer Mode) cell streams are a commonly used way to format and transport data in a digital telecommunication system, for example over an ADSL (Asymmetric Digital Subscriber Line) link. An ATM cell comprises a 5-byte cell header and 48 bytes of payload. The cell header contains address and control data, which is used in a network to direct the transfer of the ATM cell from its source to its destination. The payload contains the data to be communicated to the destination.

International standards for ADSL and other forms of DSL (such as ITU-T Recommendation G992.1 entitled "Asymmetrical digital subscriber line (ADSL) transceivers," ITU-T Recommendation G992.2 entitled "Splitterless asymmetric digital subscriber line (ADSL) transceivers," ITU-T Recommendation G992.3 entitled "Asymmetric digital subscriber line transceivers—2 (ADSL2)," and ITU-T Recommendation G992.4 entitled "Splitterless asymmetric digital subscriber line transceivers 2 (splitterless ADSL2)") define a method of conveying ATM cell streams over the DSL link. The method requires, amongst other things, that as cells are processed in the transmitting modem, the payload data bytes in each transmitted cell are scrambled using a self-synchronizing scrambler with polynomial $X^{43}+1$. An equivalent way of describing the scrambling process is that for the stream of successive bits making up the input to the scrambler, $x(n)$ ($n=0, 1, 2, \ldots$), the output of the scrambler $y(n)$ is defined recursively as:

$$y(n)=x(n)+y(n-43)$$

where + means addition modulo 2 (which is equivalent to logical "exclusive-or"). In other words, for each input bit, the output bit is the exclusive-or of that input bit and the output bit from 43 bit-times earlier. This scrambling scheme is also employed in a number of other contexts where ATM streams are passed between processing units over intermediate links.

In the receiving modem, the data must then be de-scrambled by applying the inverse operation to recover the original values of the data bytes which were input to the scrambling process in the transmitting modem. Thus, the de-scrambler should implement the inverse processing to create a de-scrambled sequence $z(n)$, where $n=(0,1,2,\ldots)$, by any means equivalent to:

$$z(n)=y(n)+y(n-43)$$

where again + means addition modulo 2. Unlike the scrambling process, the descrambling process is not recursive—the output bits depend only on current and previous input bits, not on previous output bits. If no corruption of the $y(n)$ sequence has occurred between scrambler and de-scrambler, $z(n)$ will equal $x(n)$ for all $n \geq 43$. For $n<43$, the values of both $y(n)$ and $z(n)$ depend respectively on the initial values of scrambler and de-scrambler versions of the sequence $y(m)$ ($m=-43, -42, \ldots -1$), which is not defined. If $y(m)$ at the receiver=$y(m)$ at the transmitter then $z(n)$ will equal $x(n)$ for all $n \geq 0$, but this matching is neither required nor guaranteed by the standards. The fact that the first 43 bits of the de-scrambled bit stream are not reliable is usually considered an unimportant issue in practice.

A further common requirement for transmission of ATM cell streams over a DSL link concerns the ordering of the data bits in each byte of the ATM cell data being sent and received over the DSL link. When cells are passed across the external data interface of a DSL modem, DSL standards require the bits in each byte of the cell to be reversed in order. In other words, whereas externally the most significant bit of each byte is processed first, internally in the modem, the least significant bit of each byte must be processed first, but the actual order of processing of the bits must be preserved throughout. This reversal applies to all bytes of each ATM cell. This bit order reversal is performed in both directions of transfer at the modem's external interface, i.e. both for ATM cells incoming for transmission across the DSL link, and for ATM cells which have been received across the DSL link, to be sent out via the external data interface.

In an ATM-based modem in a telecommunication system, ATM cells may be received by the modem, over the physical link(s) the modem controls, at a high rate. An example of this situation would be in a multi-line ADSL or VDSL modem in a central-office DSL access multiplexer. Because of the high rate, it is important for the modem to be able to de-scramble the payload data of the ATM cells efficiently.

In prior art hardware oriented DSL modems, the de-scrambling of data is typically performed by fixed-function logic circuits. However, such system designs are typically much less adaptable to varying application requirements. In such hardware implementations of the de-scrambling function, the data flow is fixed in an arrangement dictated by the physical movement of data through the hardware, and cannot be adapted or modified to suit different modes of use. For example, in such systems, the 'state' (the history of earlier input bits) is held internally within the de-scrambling hardware, rather than being passed in as and when de-scrambling is required. This means that re-using a hardware implementation to de-scramble multiple distinct data streams at the same time is either impossible, or certainly more complex to implement, since some arrangement must be made to allow the individual states for the different streams to be swapped in and out.

Current prior art DSL modems often use software to perform at least some of the various functions in a modem. One disadvantage of de-scramblers in current DSL modems is the inefficiency of such de-scramblers as the line-density and data-rates required of modems increase. As line-density and data-rates increase, so does the pressure on prior art de-scramblers to perform efficiently the individual processing tasks, such as de-scrambling, which make up the overall modem function.

Another disadvantage with current prior art de-scramblers is the software complexity required to implement such de-scramblers. Using conventional bit-wise instructions such as bit-wise shift, bit-wise exclusive-or, etc. may take many tens or even hundreds of cycles to perform the ATM de-scrambling operation for a single ATM cell. One processor may need to handle several hundred thousand ATM cells per second. Thus, the de-scrambling process for each cell can represent a significant proportion of the total computational cost for current prior art DSL modems, especially in the case of a multi-line system where one processor handles the operations for multiple lines. With increasing workloads, it becomes necessary to improve the efficiency of de-scrambling and bit-order-reversing ATM cell payload bytes over that of such prior art modems.

Further limitations and disadvantages of conventional and traditional approaches will become apparent to one of skill in the art, through comparison of such systems with the present invention as set forth in the remainder of the present application with reference to the drawings.

SUMMARY OF THE INVENTION

According to the present invention, these objects are achieved by a system and method as defined in the claims. The dependent claims define advantageous and preferred embodiments of the present invention.

The present invention provides a method and apparatus for efficiently de-scrambling and bit-order-reversing one or more bytes of ATM payload data according to DSL standards in a modem processor. In a preferred embodiment, this is achieved by providing an instruction for de-scrambling and bit-order-reversing one or more bytes of data according to the DSL standards in a modem processor. The system and method of this embodiment advantageously provide a processor with the ability to de-scramble and bit-order-reverse ATM payload data with a single instruction thus allowing for more efficient and faster de-scrambling operations for subsequent transfer of ATM cells out of the device. The present invention also advantageously provides great flexibility in determining the arrangement and flow of data during the de-scrambling and bit-order reversal process through the use of registers and memory for storing the scrambled source data, the resulting de-scrambled and bit-order-reversed data, and the previous de-scrambling state.

These and other advantages, aspects and novel features of the present invention, as well as details of an illustrated embodiment thereof, will be more fully understood from the following description and drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 3A illustrates an instruction format for a three-operand instruction supported by the processor in accordance with one embodiment of the present invention.

FIG. 3B illustrates an instruction format for de-scrambling and bit-order-reversing one or more bytes in accordance with one embodiment of the present invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known processes and steps have not been described in detail in order not to unnecessarily obscure the present invention.

The invention generally pertains to a new instruction for operating a processor which significantly reduces the number of cycles needed to perform the de-scrambling and bit-order-reversal of ATM cell payload data in accordance with DSL standards (e.g. ADSL or VDSL). In one embodiment, the present invention directly implements both the de-scrambling and bit-order-reversal process for 8 bytes (64 bits) of payload data in a single operation. The instruction takes as input 64 bits of scrambled source data, and 43 bits of previous de-scrambling state, and produces as output 64 bits of de-scrambled and bit-order-reversed payload data. Because of the definition of the de-scrambling process, the last 43 bits of the scrambled input data from one application of the instruction for an ATM payload data stream act as the "previous de-scrambling state" input to the next application of the instruction to the same stream. As used herein, the terms bit-order-reverse, bit-order-reversal, bit-reversal and the like mean creating a new linear bit sequence by taking the bits of the original linear bit sequence in reverse order as is required under DSL standards for the transmission of ATM cells. The present invention can be used in an implementation of an ADSL Termination Unit—Central (Office) (ATU-C), in a VDSL Transceiver Unit—Optical Network unit (VTU-O), or in customer premise equipment such as an ADSL Termination Unit—Remote end (ATU-R), or a VDSL Transceiver unit—Remote site (VTU-R), or in other contexts that require payload data to be de-scrambled and bit-order-reversed in the same way.

The new instruction takes as one input an 8-byte sequence of ATM cell payload bytes (assumed to have been transferred directly from a modem's external data interface) as a composite 64-bit value. Its second input is a 43-bit value holding the internal state of the de-scrambling process between consecutive sections of data being de-scrambled. As described above this 43-bit state is equal to the last 43 bits of the previous input to the de-scrambling process.

Embodiments of the invention are discussed below with references to FIGS. 1 to 4. However, those skilled in the art will readily appreciate that the detailed description given herein with respect to these figures is for explanatory purposes as the invention extends beyond these limited embodiments.

Figure 1:
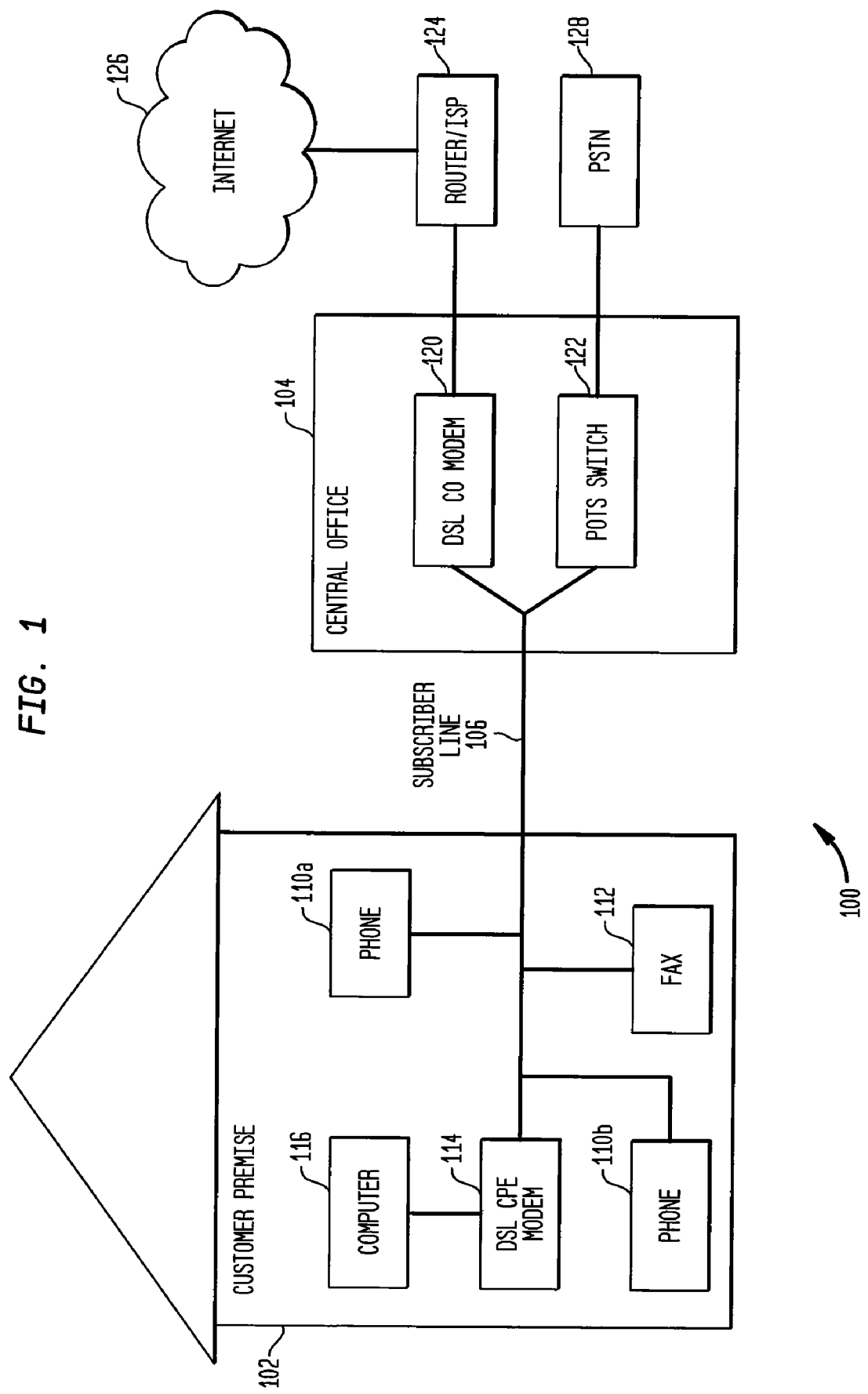
FIG. 1 illustrates a block diagram of a communications system in accordance with the present invention.

Referring now to FIG. 1, there is shown a block diagram of a communications system 100 in accordance with one embodiment of the present invention. System 100 provides traditional voice telephone service (plain old telephone service—POTS) along with high speed Internet access between a customer premise 102 and a central office 104 via a subscriber line 106. At the customer premise end 102, various customer premise devices may be coupled to the subscriber line 106, such as telephones 110a, 110b, a fax machine 112, a DSL CPE (Customer Premise Equipment) modem 114 and the like. A personal computer 116 may be connected via DSL CPE modem 114. At the central office end 104, various central office equipment may be coupled to the subscriber line 106, such as a DSL CO (Central Office) modem 120 and a POTS switch 122. Modem 120 may be further coupled to a router or ISP 124 which allows access to the Internet 126. POTS switch 122 may be further coupled to a PSTN 128.

In accordance with one embodiment of the present invention, system 100 provides for data to be sent in each direction as a stream of ATM cells between the central office 104 and the customer premise 102 via subscriber line 106. As data is sent from the customer premise 102 to the central office 104, the DSL CO modem 120 at the central office 104 receives the payload data, de-scrambles, and bit-order-reverses the payload data of each ATM cell in accordance with the principles of the present invention. Similarly, when data is sent from the central office 104 to the customer premise 102, the DSL CPE modem 114 at the customer premise 102 de-scrambles and then bit-order-reverses the payload data of each cell in accordance with the principles of the present invention. In a preferred embodiment, DSL CO modem 120 incorporates a BCM6411 or BCM6510 device, produced by Broadcom Corporation of Irvine, Calif., to implement its various functions.

Figure 2:
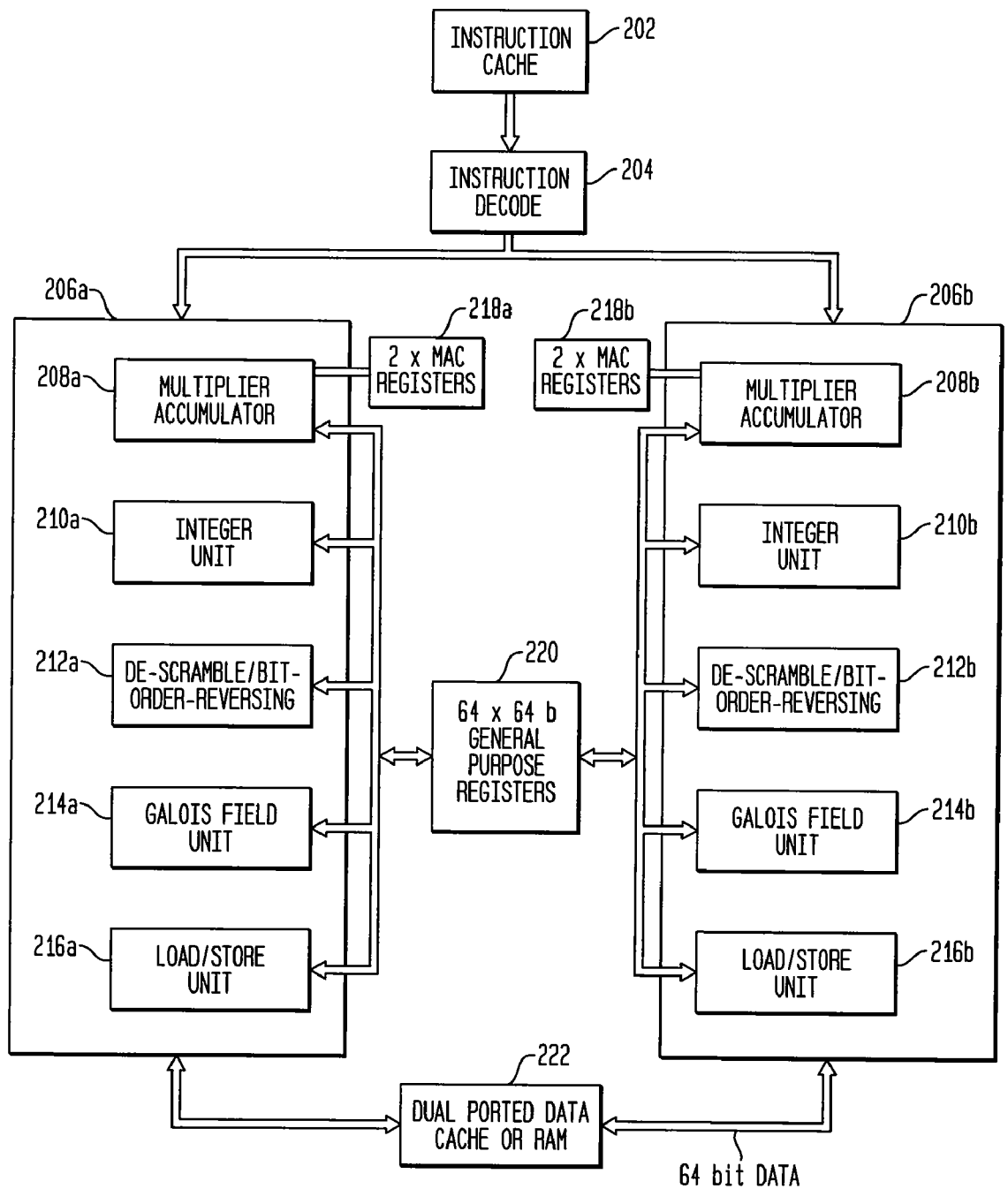
FIG. 2 illustrates a block diagram of a processor in accordance with one embodiment of the present invention.

Referring now to FIG. 2, there is shown a schematic block diagram of the core of a modem processor 200 in accordance with one embodiment of the present invention. In a preferred embodiment, processor 200 is the FirePath processor used in the BCM6411 and BCM6510 devices. The processor 200 is a 64 bit long instruction word (LIW) machine consisting of two execution units 206a, 206b. Each unit 206a, 206b is capable of 64 bit execution on multiple data units, (for example, four 16 bit data units at once), each controlled by half of the 64 bit instruction. The twin execution units, 206a, 206b, may include single instruction, multiple data (SIMD) units.

Processor 200 also includes an instruction cache 202 to hold instructions for rapid access, and an instruction decoder 204 for decoding the instruction received from the instruction cache 202. Processor 200 further includes a set of MAC Registers 218a, 218b, that are used to improve the efficiency of multiply-and-accumulate (MAC) operations common in digital signal processing, sixty four (or more) general purpose registers 220 which are preferably 64 bits wide and shared by execution units 206a, 206b, and a dual ported data cache or RAM 222 that holds data needed in the processing performed by the processor. Execution units 206a, 206b further comprise multiplier accumulator units 208a, 208b, integer units 210a, 210b, de-scrambler/bit-order-reversing units 212a, 212b, Galois Field units 214a, 214b, and load/store units 216a, 216b.

Multiplier accumulator units 208a, 208b perform the process of multiplication and addition of products (MAC) commonly used in many digital signal processing algorithms such as may be used in a DSL modem.

Integer units 210a, 210b, perform many common operations on integer values used in general computation and signal processing.

Galois Field units 214a, 214b perform special operations using Galois field arithmetic, such as may be executed in the implementation of the well-known Reed-Solomon error protection coding scheme.

Load/store units 216a, 216b perform accesses to the data cache or RAM, either to load data values from it into general purpose registers 220 or store values to it from general purpose registers 220. They also provide access to data for transfer to and from peripheral interfaces outside the core of processor 200, such as an external data interface for ATM cell data.

De-scrambler/bit-order-reversing units 212a, 212b directly implement the de-scrambling and bit-order-reversing process for the processor 200. These units may be instantiated separately within the processor 200 or may be integrated within another unit such as the integer unit 210. In one embodiment, each de-scrambling/bit-order-reversing unit 212a, 212b takes as input 64 bits of scrambled source data, and 43 bits of previous de-scrambling state, and produces as output 64 bits of de-scrambled and bit-order-reversed payload data. While as described above the scrambling process is recursive in nature (later output bits depend on earlier output bits), the de-scrambling process is not: later output bits depend only on earlier input bits, not earlier output bits. The last 43 bits of the scrambled input data from one application of this instruction for some data stream act as the "previous de-scrambling state" input to the next application of the de-scrambling function to the same data stream.

Referring now to FIG. 3A, there is shown an example of an instruction format for a three-operand instruction supported by the processor 200. In one embodiment, the instruction format includes 14 bits of opcode and control information, and three six-bit operand specifiers. As will be appreciated by one skilled in the art, exact details such as the size of the instruction in bits, and how the various parts of the instruction are laid out and ordered within the instruction format, are not themselves critical to the principles of the present invention: the parts could be in any order as might be convenient for the implementation of the instruction decoder 204 of the processor 200 (including the possibility that any part of the instruction such as the opcode and control information may not be in a single continuous sequence of bits such as is shown in FIG. 3). The operand specifiers are references to registers in the set of general purpose registers 220 of processor 200. The first of the operands is a reference to a destination register for storing the results of the instruction. The second operand is a reference to a first source register for the instruction, and the third operand is a reference to a second source register for the instruction.

Referring now to FIG. 3B, there is shown an example of a possible instruction format for de-scrambling and bit-order-reversing one or more bytes of data (ATMDSC) supported by processor 200 in accordance to the present invention. Again it should be observed that exact details of how this instruction format is implemented—the size, order and layout of the various parts of the instruction, exact codes used to represent the ATMDSC opcode, etc.—are not critical to the principles of the present invention. The ATMDSC instruction uses the three-operand instruction format shown in FIG. 3A, and in one embodiment, is defined to take three six-bit operand specifiers. The first of the operands is a reference to a destination register for an output "out" where the results of the ATMDSC instruction are stored. The second operand is a reference to a source register for a state input "state" from which state data is read, and the third operand is a reference to a source register for the data input "in" from which the scrambled source data is read. One skilled in the art will realize that the present invention is not limited to any specific register or location for those registers but that the instruction of the present invention may refer to an arbitrary register in the general purpose registers 220.

Thus, by means of this generality of specification, the present invention advantageously achieves great flexibility in the use of the invention. For example, the present invention enables the scrambled source data, which is to be de-scrambled and bit-order-reversed, to be obtained from any location chosen by the implementor (e.g. from one of the general purpose registers 220 where it could have been left after a previous stage of processing, or by loading the data from the memory 222, into any convenient register). Likewise, the resulting de-scrambled and bit-order-reversed data may be placed anywhere convenient for further processing such as in some general purpose register 220 for immediate further operations, or the resulting de-scrambled and bit-order-reversed data may be placed back in memory 222 for later use, or written directly to an external data interface via the load/store units 216a, 216b, for transfer out of the modem. Similarly, the arrangement of how the 'state' data is obtained is also completely unconstrained, but may be arranged according to preference as to how the de-scrambled and scrambled data streams are handled. Thus, the flexibility of the present invention is in sharp contrast to conventional (hardware) implementations of the de-scrambling function, where the data flow is fixed in an arrangement dictated by the physical movement of data through the hardware, and cannot be adapted or modified to suit different modes of use. For example, typically in such hardware contexts the 'state' (the history of earlier output bits) is held internally within the de-scrambling hardware, rather than being passed in as and when de-scrambling is required. This means that re-using a hardware implementation to de-scramble multiple distinct data streams at the same time is either impossible, or certainly more complex to implement, since some arrangement must be made to allow the individual states for the different streams to be swapped in and out.

Including the bit-order-reversal process as part of the function carried out by the instruction of the present invention is advantageous in that the external data interface circuitry through which the ATM cells are transferred can simply pass all bytes through in the standard bit-order, rather than itself reverse the order. Thus, the external data interface as used with the present invention is not specialized to the handling of only ATM cell data and could be used to transfer other types of data (which are unlikely to require the bit-order reversal) without impediment. Moreover, in this way the present invention allows for software to process certain parts of the ATM cells (particularly the cell headers which are distinct from the payload bytes) in the standard bit order (as used outside the DSL modem), e.g. to work with cell addressing information which is stored in each cell header, before the cells are passed out through the external data interface. If the external data interface itself reversed the bit-order for all bytes passing through, this would necessitate an extra step of reversing and re-reversing the bit-order for the cell header bytes being specifically processed.

In one embodiment, the de-scrambling/bit-order-reversing instruction is used in the software on a processor chip-set implementing a central-office modem end of a DSL link (e.g. ADSL or VDSL). However, one skilled in the art will realize that the present invention is not limited to this implementation, but may be equally used in other contexts where data must be de-scrambled and bit-order-reversed in the same way, such as in a DSL CPE modem at the customer premise, or in systems not implementing DSL.

In one embodiment, the ATMDSC instruction takes as one input an 8-byte sequence of scrambled data bytes as a composite 64-bit value. Its second input is a 43-bit value holding the state of the de-scrambling process between consecutive sections of data being de-scrambled, along with 21 bits which are ignored. In a preferred embodiment, this 43-bit state is equal to the last 43 bits of the previous input to the de-scrambling process (i.e. the scrambled data bits processed in a previous execution of the instruction for the same data stream). In operation of the present invention, the input data bytes are de-scrambled using the defined de-scrambling method acting upon each consecutive bit in the data input operand. This combines the 64 bits of data with the 43 bits of previous scrambled data, to yield 64 bits (8 bytes) of de-scrambled intermediate result. The 64 bits (8 bytes) of intermediate result data each have their bit order reversed thus satisfying the requirement for bit order change between internal and external versions of the bytes of each ATM cell, without requiring additional hardware in the modem circuits implementing the external data transfer. The 64 bits (8 bytes) of de-scrambled and bit-order-reversed payload data are then written to the output operand. The format of this data is then suitable for direct output through the modem's external data interface.

More specific details of one embodiment of the operation performed by the ATMDSC instruction are described below:

| | |
|---|---|
| tmp.<42..0> = | in.<42..0> ^ state.<63..21> |
| tmp.<63..43> = | in.<63..43> ^ in.<20..0> |
| out.<7..0> = | BITREV(tmp.<7..0>) |
| out.<15..8> = | BITREV(tmp.<15..8>) |
| out.<23..16> = | BITREV(tmp.<23..16>) |
| out.<31..24> = | BITREV(tmp.<31..24>) |
| out.<39..32> = | BITREV(tmp.<39..32>) |
| out.<47..40> = | BITREV(tmp.<47..40>) |
| out.<55..48> = | BITREV(tmp.<55..48>) |
| out.<63..56> = | BITREV(tmp.<63..56>) |

In the above description, the meanings of the terms are defined as described below.

| | |
|---|---|
| val.n | (where val stands for any identifier such as data, state, etc . . . and n stands for an integer, e.g. 45) means bit n of value val, where bit 0 is the least significant and earliest bit and bit 1 is the next more significant (more recent) bit, etc. |
| val.<m . . . n> | means the linear bit sequence (val.m, val.(m − 1), . . . val.n) considered as an ordered composite multi-bit entity where val.m is the most significant (and most recent) bit and val.n the least significant (and earliest) bit of the sequence. |
| BITREV(bseq) | creates a new linear bit sequence by taking the bits of the linear bit sequence bseq in reverse order. |
| bseq1 ^ bseq2 | means the linear bit sequence resulting from a parallel bit-wise operation where each bit of the linear bit sequence bseq1 is combined with the corresponding bit of linear bit sequence bseq2 using the logical "exclusive-or" function. |

Figure 4:
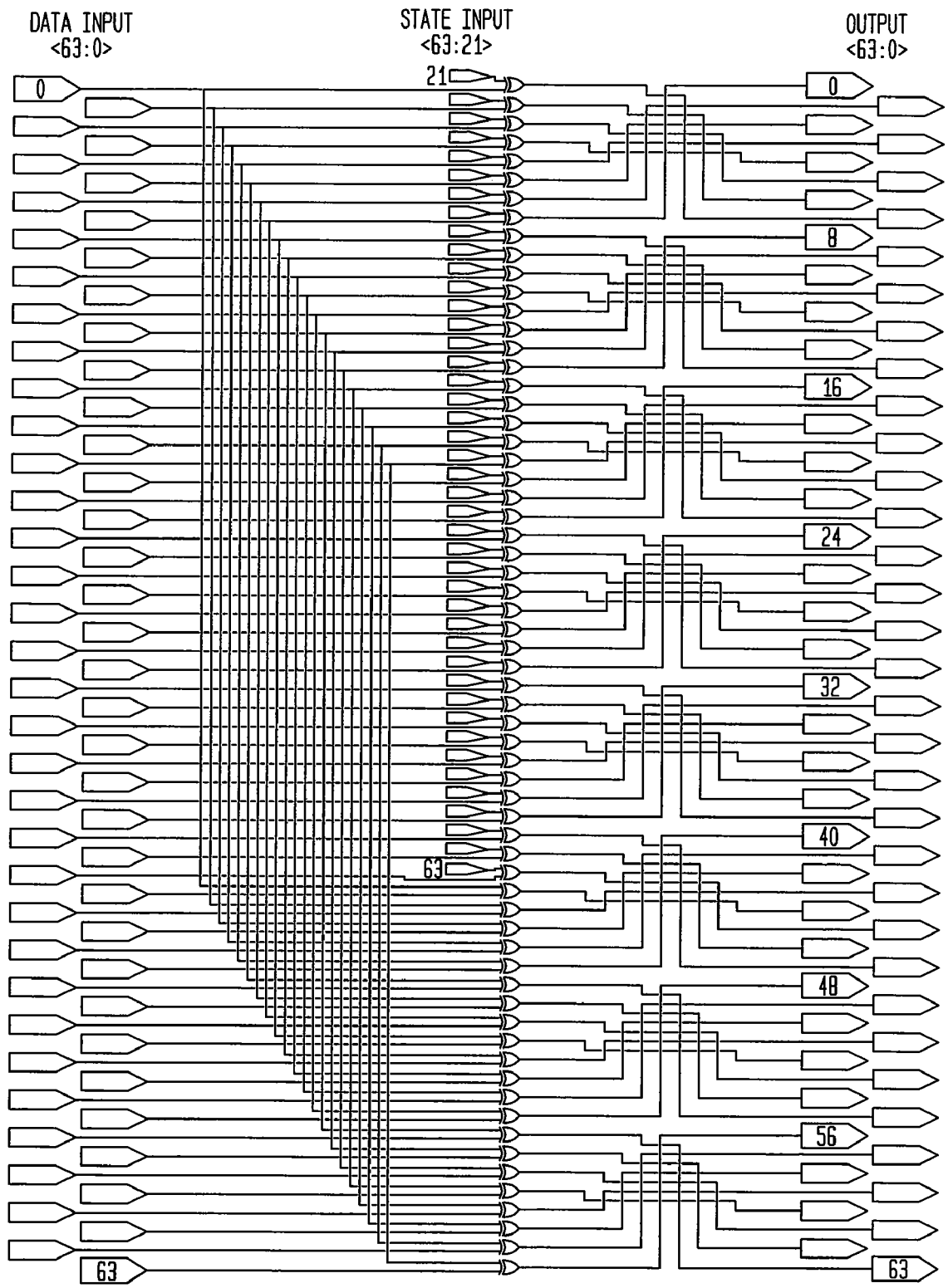
FIG. 4 is a logic diagram of one embodiment of the de-scrambling/bit-order-reversing instruction.

Referring now to FIG. 4, there is shown a logic diagram of one embodiment of the ATMDSC instruction as it may be implemented within an execution unit of a processor. As will be understood by one skilled in the art, the diagram shows only the core functional logic implementing the specific details of the ATMDSC instruction; other non-specific aspects required to implement any processor (such as how the source data bits are directed from their respective registers to the specific logic function for a particular instruction, and how the result value is returned to the required register), are not shown.

In the embodiment in FIG. 4, the gates shown are XOR (exclusive-or) gates. The first 21 bits of the state input are unused and not shown in FIG. 4. The 64 bits of the "data" input appear in order at the left of the diagram; the 43 used bits from the "state" input appear in order in the middle of the diagram; and the 64 bits of the output value "out" are generated in order at the right side of the diagram.

In the wiring format used in FIG. 4, a short gap is left in any horizontal wire which crosses but is not joined to a vertical wire to show that there is no connection between them. Any horizontal wire which crosses a number of vertical wires therefore appears as a dashed line.

One skilled in the art will realize that this is only one of many possible arrangements of the logic for the present invention. The present invention is not limited to this embodiment of the logic, but may apply to any logic arrangement that produces the same result. One skilled in the art will also appreciate that other logic circuitry for implementing the present invention may be generated by using a logic-optimizing software program, such as "BuildGates" by Cadence Design Systems, Inc., which is given as input a top-level description of the logic function, i.e. comparable to the equations listed above. Thus, the present invention advantageously completes the whole de-scrambling and bit-order-reversal operation for 8 bytes in a single cycle. As a result, the present invention advantageously increases the efficiency of de-scrambling data for subsequent use.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for executing a single instruction de-scrambler and bit-order-reversal on a processor, the method comprising:
    providing the processor with a single instruction that includes an opcode indicating a de-scrambling and bit-order-reversal instruction;
    providing the processor with an input data value using a first field of the instruction;
    providing the processor with an input state value using a second field of the instruction;
    providing the processor with a reference to a destination register of the processor using a third field of the instruction;
    de-scrambling and bit-order-reversing the input data value using the input state value to create a de-scrambled and bit-order-reversed output value; and
    storing the de-scrambled and bit-order-reversed output value in the destination register.

2. The method of claim 1, wherein the input data value is de-scrambled in accordance with Asynchronous Transfer Mode (ATM) standards.

3. The method of claim 1, wherein the input data value is 64 bits of scrambled source data.

4. The method of claim 1, wherein the de-scrambled and bit-order-reversed output value is a 64-bit output.

5. The method of claim 4, wherein the last 43 bits of the 64 bits of de-scrambling and bit-order reversed output data from one application of the de-scrambling and bit-order-reversal instruction is the input state value for the next application of the de-scrambling and bit-order-reversal instruction.

6. The method of claim 1, wherein the method is used in a central-office modem end of a Digital Subscriber Line (DSL) link.

7. A processor comprising:
a plurality of registers; and
at least one execution unit, coupled to the plurality of registers, configured to receive a single bit-order-reversal and de-scrambling instruction that includes a first field relating to an input data value and second field relating to an input state value, de-scramble and bit-order-reverse the input data value using the input state value to generate a de-scrambled and bit-order-reversed output data value, and store said de-scrambled and bit-order-reversed output data value in at least one of said plurality of registers.

8. The processor of claim 7, wherein the instruction receives 64 bits of scrambled source data and 43 bits of previous de-scrambling state data, and produces as output 64 bits of de-scrambled and bit-order reversed output data.

9. The processor of claim 8, wherein the last 43 bits of the 64 bits of de-scrambled and bit-order reversed output data from one application of the instruction is the previous de-scrambling state data for the next application of the instruction.

10. The processor of claim 7, wherein the data is Asynchronous Transfer Mode (ATM) cell payload data and the ATM cell payload data is de-scrambled according to ATM standards.

11. The processor of claim 7, wherein the processor is a 64-bit long instruction word machine comprising two execution units.

12. The processor of claim 7, wherein the processor is used in a chip or chip-set implementing a central-office modem end of a Digital Subscriber Line (DSL) link.

13. The processor of claim 7, wherein the processor is used in a chip or chip-set implementing a customer premise equipment modem end of a Digital Subscriber Line (DSL) link.

14. The processor of claim 7, wherein 8 bytes of data are de-scrambled and bit-order-reversed in a single cycle.

15. An apparatus comprising:
    a processor, responsive to a single instruction that includes a first field relating to an input data value and a second field relating to an input state value, comprising means for de-scrambling and bit-order-reversing said input data value using said input state value to generate a de-scrambled and bit-order-reversed output data value;
    a plurality of registers accessible to the processor, wherein said de-scrambled and bit-order-reversed output data value is stored in at least one of the plurality of registers.

16. The apparatus of claim 15, wherein the instruction receives as input 64 bits of scrambled source data and 43 bits of previous de-scrambling state data, and produces as output 64 bits of de-scrambled and bit-order reversed data.

17. The apparatus of claim 16, wherein the last 43 bits of the 64 bits of de-scrambled and bit-order reversed output data from one application of the instruction is the previous de-scrambling input data for the next application of the instruction.

18. The apparatus of claim 15, wherein the data is Asynchronous Transfer Mode (ATM) cell payload data and the ATM cell payload data is de-scrambled according to ATM standards.

19. The apparatus of claim 15, wherein the processor is a 64-bit long instruction word machine comprising two execution units.

20. The apparatus of claim 15, wherein the processor is used in a chip or chip-set implementing a central-office modem end of a Digital Subscriber Line (DSL) link.

21. The apparatus of claim 15, wherein the processor is used in a chip or chip-set implementing a customer premise equipment modem end of a Digital Subscriber Line (DSL) link.

22. The apparatus of claim 15, wherein 8 bytes of data are de-scrambled and bit-order-reversed in a single cycle.

* * * * *